(12) United States Patent
Kostrzewa et al.

(10) Patent No.: US 7,869,919 B1
(45) Date of Patent: Jan. 11, 2011

(54) INFRARED CAMERA SYSTEMS AND METHODS FOR VEHICULAR APPLICATIONS

(75) Inventors: Joseph Kostrzewa, Buellton, CA (US); William A. Terre, Santa Barbara, CA (US); James T. Woolaway, Santa Barbara, CA (US)

(73) Assignee: Flir Systems, Inc., Wilsonville, OR (US)

( * ) Notice: Subject to any disclaimer, the term of this patent is extended or adjusted under 35 U.S.C. 154(b) by 892 days.

(21) Appl. No.: 11/439,638

(22) Filed: May 24, 2006

(51) Int. Cl.
*G02B 5/12* (2006.01)
*G02B 7/198* (2006.01)
*B60R 1/00* (2006.01)
*G02B 27/01* (2006.01)

(52) U.S. Cl. .................... 701/36; 359/514; 359/881
(58) Field of Classification Search .................. 701/36, 701/300; 250/330, 332, 334; 348/148, 164; 359/514, 881
See application file for complete search history.

(56) References Cited

U.S. PATENT DOCUMENTS

| | | | | |
|---|---|---|---|---|
| 4,626,905 A * | 12/1986 | Schmidt | ..................... | 348/36 |
| 4,682,029 A * | 7/1987 | Diepeveen et al. | .......... | 250/330 |
| 4,710,001 A * | 12/1987 | Lacey | .......................... | 359/881 |
| 5,001,558 A * | 3/1991 | Burley et al. | ................. | 348/164 |
| 5,414,439 A * | 5/1995 | Groves et al. | .................. | 345/7 |
| 5,550,675 A * | 8/1996 | Komatsu | ..................... | 359/514 |
| 5,703,643 A * | 12/1997 | Merle et al. | ................. | 348/341 |
| 5,729,016 A * | 3/1998 | Klapper et al. | .............. | 250/334 |
| 6,023,061 A * | 2/2000 | Bodkin | ....................... | 250/332 |
| 6,611,202 B2 * | 8/2003 | Schofield et al. | ............ | 340/461 |
| 6,789,901 B1 * | 9/2004 | Kormos | ....................... | 353/13 |
| 6,809,870 B2 * | 10/2004 | Fohl et al. | .................... | 359/627 |
| 6,947,191 B2 * | 9/2005 | Chen et al. | ................. | 359/225.1 |
| 7,612,799 B1 * | 11/2009 | Frank et al. | ................. | 348/164 |
| 2003/0041329 A1* | 2/2003 | Bassett | ....................... | 725/105 |
| 2004/0047058 A1* | 3/2004 | Unno et al. | .................. | 359/883 |
| 2005/0029347 A1* | 2/2005 | Noble et al. | ................. | 235/384 |
| 2005/0145794 A1* | 7/2005 | Faubion | ...................... | 250/330 |

* cited by examiner

*Primary Examiner*—Mark Hellner
*Assistant Examiner*—Ari M Diacou
(74) *Attorney, Agent, or Firm*—Haynes and Boone, LLP (57) ABSTRACT

Systems and methods are disclosed herein to provide improved infrared camera techniques for vehicular applications. For example, in accordance with an embodiment of the present invention, a vehicle includes at least a first plate to reflect infrared energy and an infrared camera to detect the infrared energy reflected from the first plate(s) to provide infrared images. The plate allows the infrared camera to provide a desired line of sight view without requiring the infrared camera to be directly within the line of sight.

24 Claims, 6 Drawing Sheets

INFRARED CAMERA SYSTEMS AND METHODS FOR VEHICULAR APPLICATIONS

TECHNICAL FIELD

The present invention relates generally to infrared cameras and, more particularly, to infrared cameras for vehicular applications, such as for example an infrared camera system within an automobile.

BACKGROUND

Infrared cameras are growing in popularity for vehicular applications, such as for example for implementation in passenger automobiles to enhance visibility under various conditions for the driver. However, there generally are a number of drawbacks for conventional implementation approaches for an infrared camera within a vehicle.

For example, an infrared camera is typically mounted within a vehicle (e.g., near the front grill or front bumper) to provide a direct forward-looking field of view, with the images from the infrared camera provided to a display screen within the vehicle's passenger compartment. However, to prevent the infrared camera from being struck by a rock or other types of debris, a typical approach provides a thick germanium window to act as a shield to protect the infrared camera and through which the infrared camera captures its images.

The thick germanium window, though, is still susceptible to being broken, scratched, or chipped (e.g., due to a direct hit from a large rock) and is expensive to replace. The germanium window may include a diamond-like coating to further strengthen and provide abrasion resistance (e.g. due to being struck by sand or other small debris), but this further adds to the cost and reduces infrared transmission through the germanium window to the infrared camera.

The conventional direct forward-looking field of view mounting of an infrared camera may also increase the infrared camera's susceptibility to damage from a front-end collision (e.g., due to its exposure directly behind the window). Furthermore, the infrared camera may be subject to extreme thermal dynamics (e.g., heating during idle and rapid cooling during forward motion) and the mounting may require complex alignment mechanisms to provide the proper field of view orientation. As a result, there is a need for improved techniques for infrared camera vehicular implementations.

SUMMARY

Systems and methods are disclosed herein to provide improved infrared camera techniques for vehicular applications. For example, in accordance with an embodiment of the present invention, an infrared camera system for a vehicle is disclosed that employs one or more plates to reflect infrared energy to an infrared camera. The plates allow the infrared camera to provide a desired line of sight view without requiring the infrared camera to be directly in the line of sight path. Consequently as discussed herein, the infrared camera system may provide certain advantages over conventional approaches for incorporating an infrared camera within a vehicle.

More specifically, in accordance with one embodiment of the present invention, a vehicle includes at least a first plate adapted to reflect infrared energy; and an infrared camera adapted to detect infrared energy reflected from the at least first plate to provide infrared images.

In accordance with another embodiment of the present invention, an infrared camera system for a vehicle includes at least a first plate adapted to reflect infrared energy; and an infrared camera adapted to detect infrared energy reflected from the at least first plate to provide infrared images.

In accordance with another embodiment of the present invention, a vehicle includes means for passing infrared energy into the vehicle; means for reflecting the infrared energy after traveling through the passing means; and means for capturing infrared images based on the infrared energy provided by the reflecting means.

In accordance with another embodiment of the present invention, a method of capturing infrared images within a vehicle includes providing an opening through which infrared energy enters the vehicle; reflecting the infrared energy after passing through the opening; and capturing the infrared images based on the infrared energy from the reflecting.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
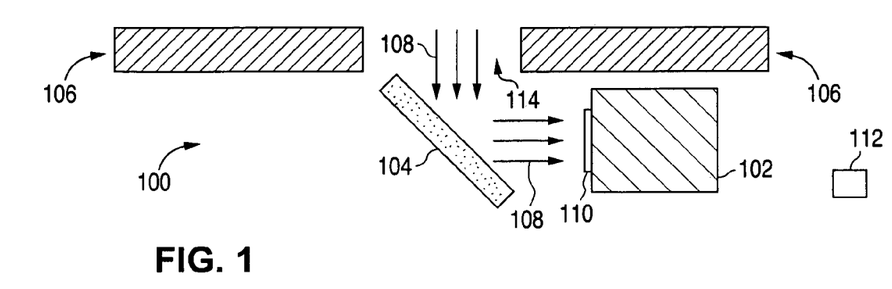
FIG. 1 shows a block diagram illustrating an infrared camera system mounted to a vehicle in accordance with an embodiment of the present invention.

FIG. 1 shows a block diagram of a system 100 illustrating an infrared camera 102 mounted within a vehicle 106 in accordance with an embodiment of the present invention. Infrared camera 102 may represent any type of conventional infrared camera (e.g., infrared detector device) adapted to capture one or more infrared images. Vehicle 106 may represent any type of vehicle (e.g., a passenger automobile, truck, bus, train, or any other type of vehicle for land, sea, or air) that a user may desire to include infrared camera 102. For clarity, only a portion of vehicle 106 is shown in FIG. 1, but it should be understood that infrared camera 102 in accordance with one or more embodiments of the present invention is mounted within vehicle 106 (e.g., mounted to vehicle 106 in some fashion).

For example, the portion of vehicle 106 that is shown may represent a bumper (e.g., a simplified top or bottom perspective view of a front bumper) or grille of vehicle 106 that infrared camera 102 is mounted behind (e.g., within the engine compartment). An opening 114 (e.g., in the bumper) may be provided in vehicle 106 through which infrared energy 108 is allowed to pass through. Opening 114 may optionally be covered with a window made of germanium, silicon, or other type of conventional material that would not adversely affect the transmission of infrared energy through opening 114 for the desired application (e.g., type of camera, desired wavelength or portion of the infrared spectrum, and other relevant factors), but the window material is not necessary and may not be desired, depending upon the application requirements.

A typical conventional automotive installation would position infrared camera 102 to directly receive infrared energy 108 as it passes through opening 114 (i.e., infrared camera 102 having a direct line of sight and field of view through opening 114 and directly exposed through opening 114). In contrast in accordance with one or more embodiments of the present invention, infrared camera 102 is positioned to receive infrared energy 108 after being reflected by one or more plates 104. For example as shown in FIG. 1, plate 104 (also referred to herein as a fold mirror) is shown reflecting infrared energy 108, which has passed through opening 114, to infrared camera 102. Infrared camera 102 may include a conventional lens 110 (e.g., refractive lens, infrared-transmissive window, and/or other conventional features) through which infrared energy 108 would pass through and be detected by an infrared detector (not shown) within infrared camera 102.

Plate 104 may be made of any type of material or materials that is capable of reflecting (e.g., redirecting) infrared energy 108. For example, plate 104 may represent a stainless steel metal plate or other type of metal or metal surface, such as aluminum or a metal-covered plastic (e.g., a hard, non-corrosive material able to reflect infrared energy). If plate 104 is a stainless steel metal plate, it may not need to be highly polished as may be required with a regular mirror, depending upon the wavelength of the infrared employed for the particular application. For example, longer infrared wavelengths (e.g., 8-14 microns) may not require as polished a surface as shorter infrared wavelengths (e.g., 3-5 microns) or visible wavelengths. In general, plate 104 should be sufficiently reflective of infrared radiation to provide the necessary image resolution by infrared camera 102 for the desired application requirements.

The infrared images captured by infrared camera 102 based on the received infrared energy 108 may be stored and/or displayed, such as on a display 112 (e.g., within the passenger compartment of the vehicle). The infrared images from infrared camera 102 may be provided to display 112 via conventional cables or via a wireless link as would be understood by one skilled in the art.

System 100 is shown with infrared camera 102 disposed 90 degrees relative to the direct line of sight through opening 114, with plate 104 disposed at a 45 degree angle (e.g., relative to opening 114 and/or relative to infrared camera 102) to reflect infrared energy 108 passing through opening 114 to infrared camera 102. However, this is not limiting and the techniques disclosed herein in accordance with one or more embodiments of the present invention may be applied to a number of other arrangements using one or more plates 104.

Figure 2:
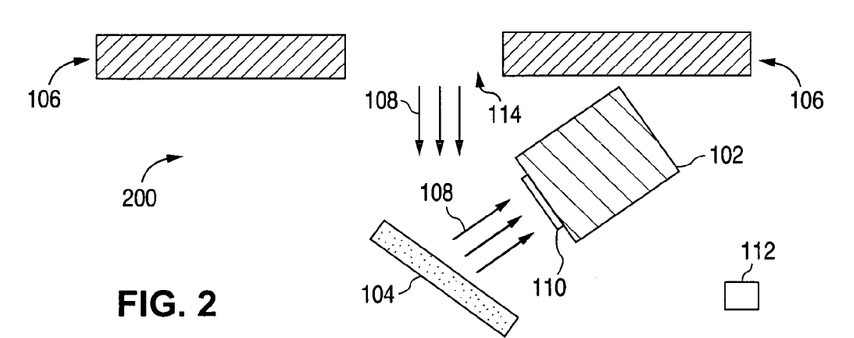
FIG. 2 shows a block diagram illustrating an infrared camera system mounted to a vehicle in accordance with an embodiment of the present invention.
Figure 3:
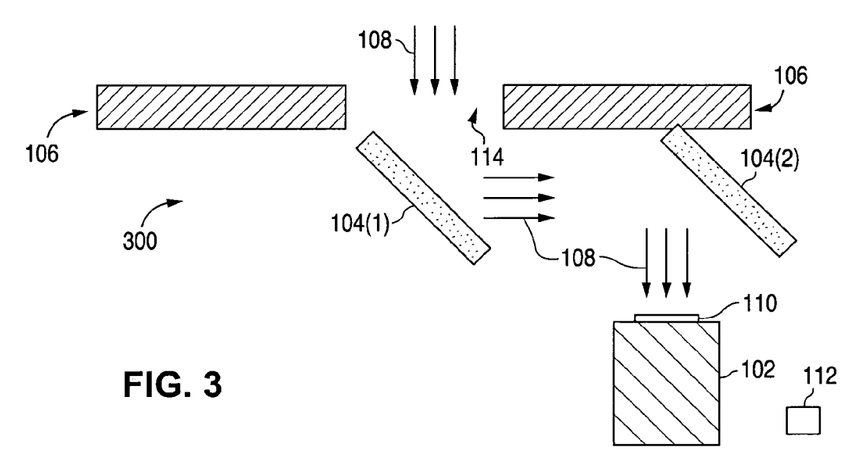
FIG. 3 shows a block diagram illustrating an infrared camera system mounted to a vehicle in accordance with an embodiment of the present invention.

For example, FIGS. 2 and 3 show block diagrams of systems 200 and 300, respectively, illustrating infrared camera 102 mounted within vehicle 106 in accordance with some embodiments of the present invention. Specifically, system 200 illustrates infrared camera 102 positioned at a greater than 90 degree orientation relative to a line of sight through opening 114, with plate 104 positioned at an appropriate angle to reflect infrared energy 108 to infrared camera 102.

System 300 illustrates the use of two plates 104 (which are separately referenced as plate 104(1) and plate 104(2) and may be referred to herein as a two fold-mirror approach) to reflect infrared energy 108 as shown to infrared camera 102. Thus, infrared camera 102 may be disposed at a variety of different angles relative to the direction of travel of infrared energy 108 through opening 114 and one or more plates 104 may be used to direct infrared energy 108 to infrared camera 102.

Although infrared camera 102 of system 300 is mounted looking directly along the line of sight, similar to conventional approaches, infrared camera 102 is no longer in the direct line of sight. Therefore, opening 114 does not need, for example, a thick germanium window to protect infrared camera 102 from debris and, furthermore, infrared camera 102 may be mounted behind a structurally more protective portion of vehicle 106 (e.g., the bumper) relative to opening 114, which may provide better protection in the event of a vehicular collision.

Figure 4:
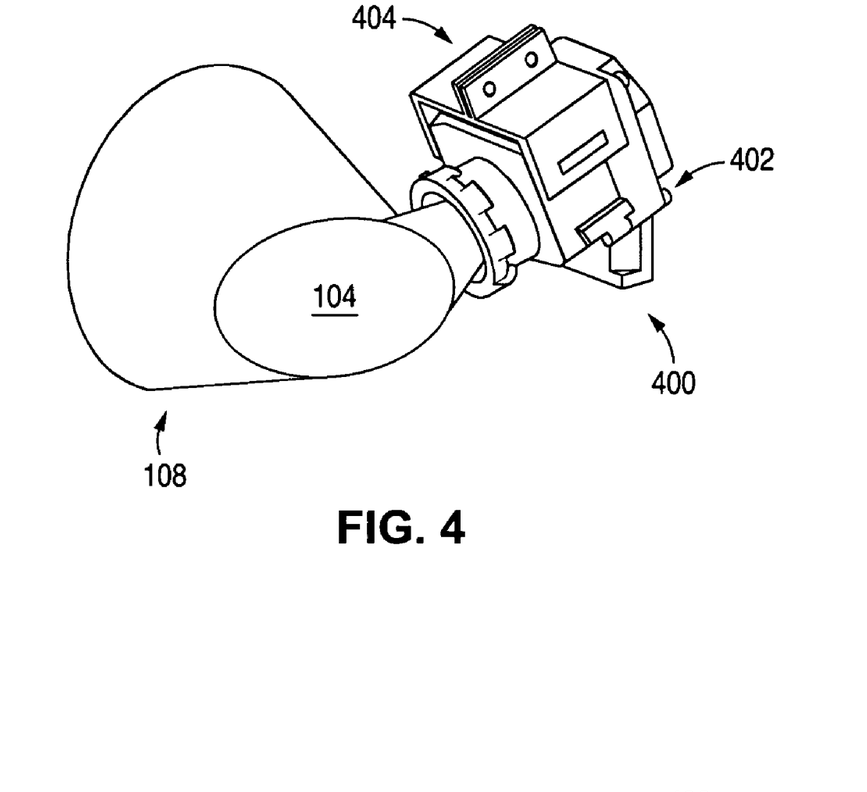
FIGS. 4 and 5 show block diagrams illustrating perspective views of an infrared camera system in accordance with an embodiment of the present invention.
Figure 5:
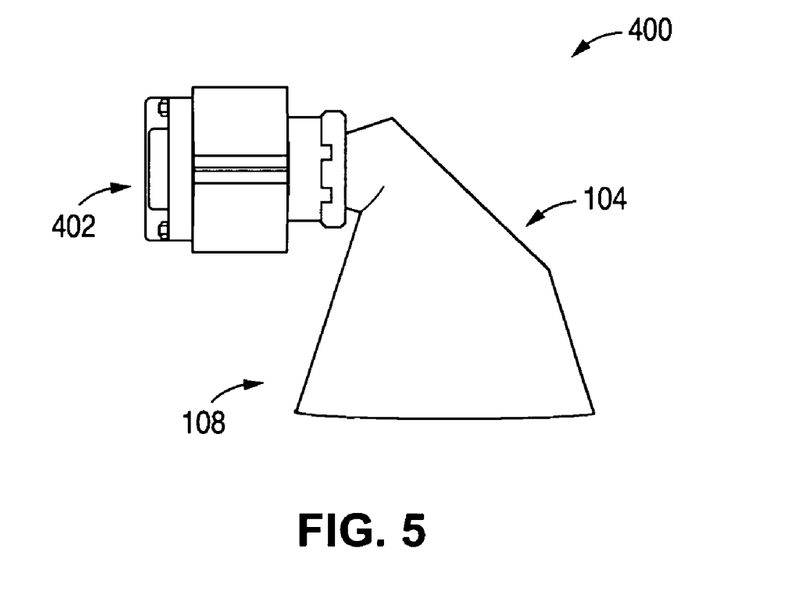

FIGS. 4 and 5 show block diagrams illustrating perspective views of an infrared camera system 400 in accordance with an embodiment of the present invention. Infrared camera system 400 includes an infrared camera 402 shown receiving infrared energy 108 reflected by plate 104 (e.g., similar to system 100 of FIG. 1). A mounting bracket 404 is attached to infrared camera 402 for mounting infrared camera 402 to a vehicle (e.g., within vehicle 106).

For example, infrared camera system 400 may illustrate infrared camera 402 disposed 90 degrees relative to infrared energy 108 traveling towards plate 104, which is orientated at approximately a 45 degree angle. The exemplary cone viewing angles for receiving infrared energy 108 may represent infrared camera 402 having a lens with a certain degree of field angle (e.g., a 36 degree field angle). Infrared camera system 400 may be incorporated into a vehicle (e.g., vehicle 106 as discussed herein) to provide infrared image data, for example, for the driver or other passengers of the vehicle.

Figure 6:
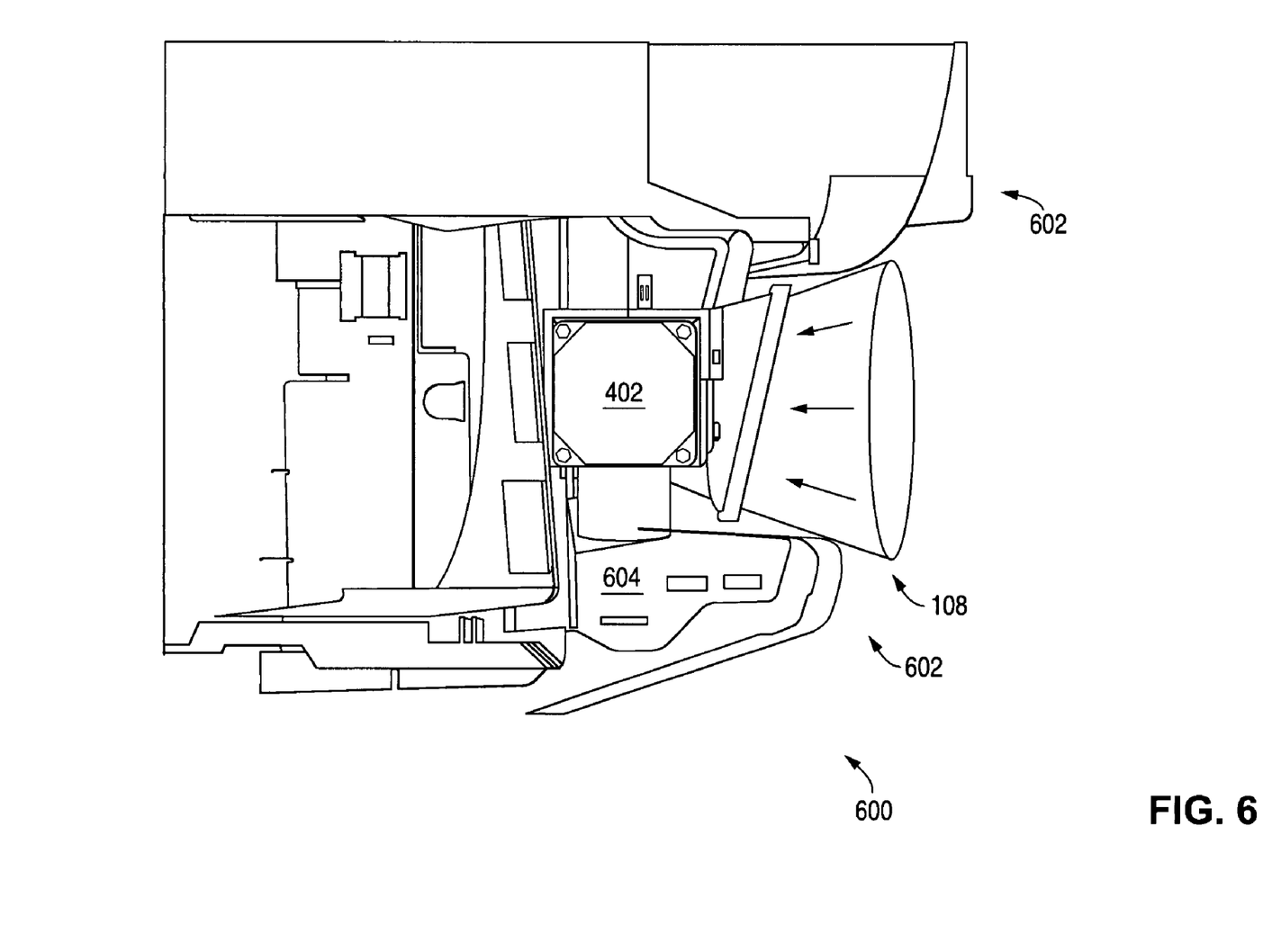
FIG. 6 shows a block diagram illustrating an infrared camera system mounted to a vehicle in accordance with an embodiment of the present invention.
Figure 7:
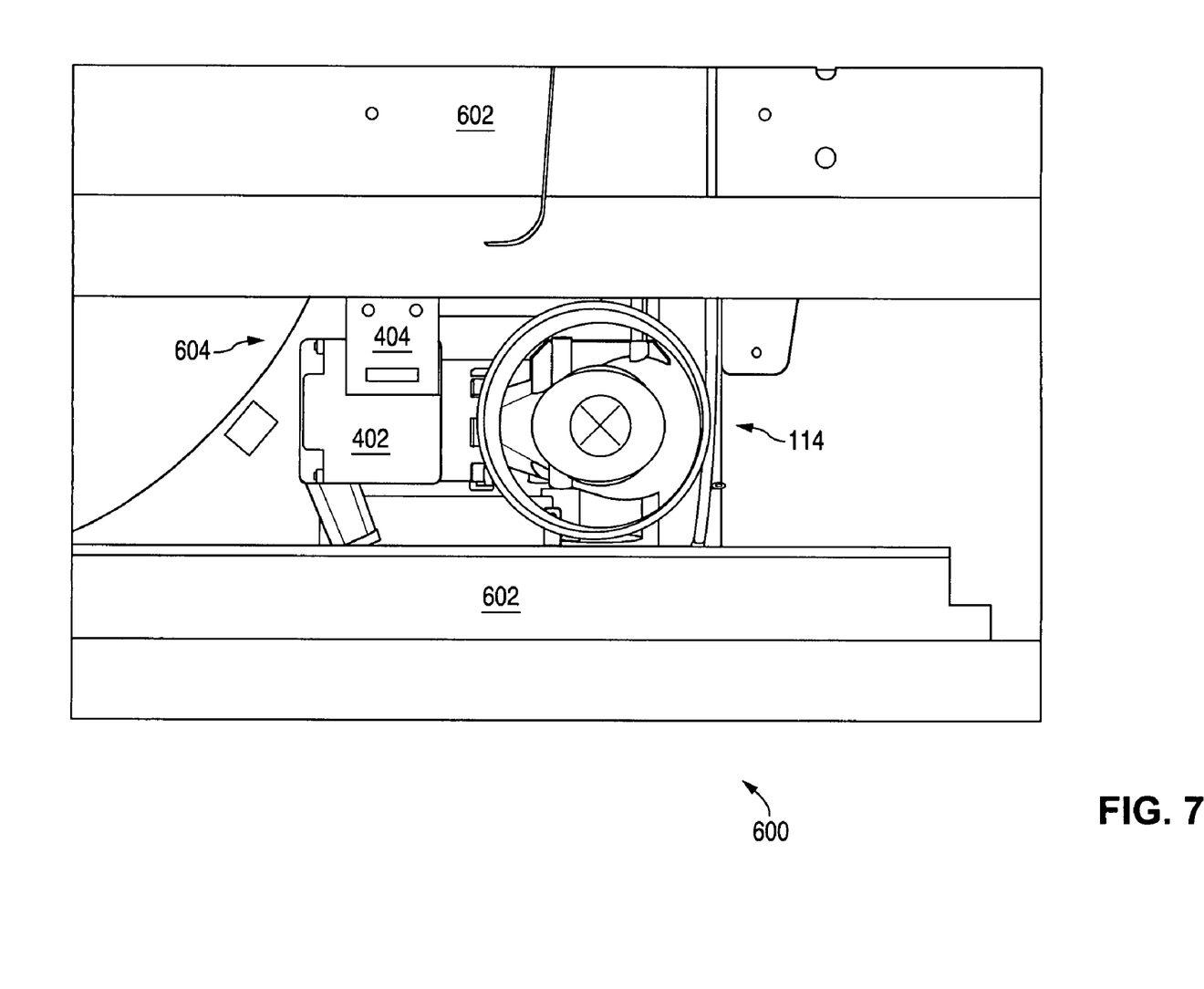
FIG. 7 shows a block diagram illustrating an infrared camera system mounted to a vehicle in accordance with an embodiment of the present invention.

For example, FIGS. 6 and 7 show block diagrams illustrating a partial cross-sectional side view and a partial cross-sectional front view, respectively, of a vehicle 600, which includes infrared camera system 400, in accordance with one or more embodiments of the present invention. A portion of vehicle 600 (e.g., vehicle 106) is shown in a partially exposed block diagram manner for clarity to illustrate infrared camera 402 mounted within and to a structural member 604 (e.g., a frame, bumper, or other portion of vehicle 600) and behind a front portion 602 (e.g., bumper) of vehicle 600. Infrared energy 108 passes through opening 114 (e.g., a 3 to 4 inch diameter opening within a bumper or other part of front portion 602), is reflected by plate 104 (e.g., one or more plates 104), and received by infrared camera 402.

The techniques disclosed herein may provide certain advantages over conventional approaches for incorporating an infrared camera into a vehicle. For example, the window of infrared camera 102 (e.g., lens 110) may be cleansed or washed by the sideway air flow across the window caused by the motion of the vehicle, as discussed further herein. A window (e.g., germanium or other type of infrared-transmissive window) is not required across opening 114 (although optionally may be included), because infrared camera 102 is not in a direct line of fire of road debris (e.g., rocks, sand, or other objects) through opening 114. Thus, the techniques disclosed herein may provide increased system reliability, removes a window design constraint, and reduces system complexity associated with the window, which may also result in maintenance cost savings as there are no longer broken or scratched windows to replace.

Plate 104 may be far less expensive than the germanium window and highly polished optics used in conventional infrared camera systems. For example depending upon the desired application and system requirements, plate 104 may not require a highly polished surface, coatings, polishing, or other conventional processing steps, but may be manufactured in a simple fashion out of punched-out disks, plates, or other desired shapes that may not appear reflective in the visible spectrum. Consequently, in accordance with one or more embodiments of the present invention, the techniques disclosed herein, including one or more plates 104, may be less expensive and easier to replace relative to conventional approaches (e.g., window replacement) for implementing an infrared camera into a vehicle.

Because infrared camera 102 is no longer directly in the line of sight through opening 114, infrared camera 102 may be better protected from collision or other damaging conditions by securely mounting and protecting infrared camera 102 behind a more solid structure. For example, infrared camera 102 may be encased in a roll cage, foam, and/or behind a reinforced portion of a bumper or other structural member of the vehicle. The protected and less exposed position of infrared camera 102 may also further protect it from adverse changes in thermal dynamics (e.g., heating during idle and rapid cooling during forward motion), which may allow improved infrared images and less non-uniformity.

Furthermore, plate 104 is less susceptible to water, snow, or other environmental conditions, which may greatly reduce transmission through a window, because plate 104 only has to reflect rather than allow infrared energy to pass through. Additionally, a hydrophobic coating may be placed on plate 104, which would typically not be placed on a conventional window (e.g., across opening 114) or lens 110 of infrared camera 102 because the hydrophobic coating is reflective and would block a significant portion of infrared energy that would be desired to pass through. Thus, for the techniques disclosed herein, the hydrophobic coating may sufficiently reflect (or not significantly reduce the reflection of) infrared energy 108 to infrared camera 102 and would not be required to allow infrared energy 108 to pass through.

Lens 110 of infrared camera 102 may also be better protected from debris, sand, and other abrasive or damaging materials than conventional approaches. Consequently for example, abrasion requirements of lens 110 may be relaxed or significantly reduced. Thus, the diamond-like coating (DLC) conventionally applied to lens 110 to protect lens 110 may be eliminated or the thickness of the DLC may be reduced, which may improve infrared transmission through lens 110 and improve the performance of infrared camera 102 relative to conventional approaches.

The mounting of infrared camera 102 would generally require less complex alignment mechanisms than conventional approaches. For example, one or more alignment mechanisms may be incorporated into the mounting bracket for plate 104. As a specific example, an alignment bracket providing two degrees of freedom, such as horizontal and vertical, may be provided for one or more plates 104, while the mounting bracket for infrared camera 102 would only be required to compensate for roll (e.g., tilt about the line of sight).

Plate 104 may also be used for dithering, as would be understood by one skilled in the art, to improve the processing of the captured images from infrared camera 102. For example, dithering or movement of plate 104 may be used to improve apparent resolution, parallax (e.g., for range estimation), provide a more desirable field of view, and/or provide for scene based non-uniformity correction (e.g., the use of the image scene rather than a shutter to determine noise levels and maintain image quality).

For example, scene based non-uniformity correction may be accomplished by moving plate 104, periodically or as required, to change the field of view of infrared camera 102 to prevent loss of image due to lack of motion or movement (e.g., when vehicle 106 is not moving and there is no movement within the field of view of infrared camera 102). Plate 104 may also be moved to provide a more desirable field of view, such as for example by adjusting the field of view of infrared camera 102 to be directed into a turn rather than directly along a centerline of vehicle 106 (i.e., at an angle from the centerline in the direction of the vehicle's turn to provide visibility into the turn rather than directly ahead of vehicle 106). For example, plate 104 may be moved via a processor to provide automatic curve imaging (e.g., automatically direct the field of view into the turn by some angle off centerline).

As a further example, display 112 may further represent a processor of vehicle 106, which is linked to infrared camera 102, display 112, and/or plate 104 to control the capturing of infrared images and the subsequent processing and display.

Plate 104 may also be implemented having a desired optical power, which may allow a reduction in the number of refractive lenses within infrared camera 102 and may reduce costs.

Figure 8A:
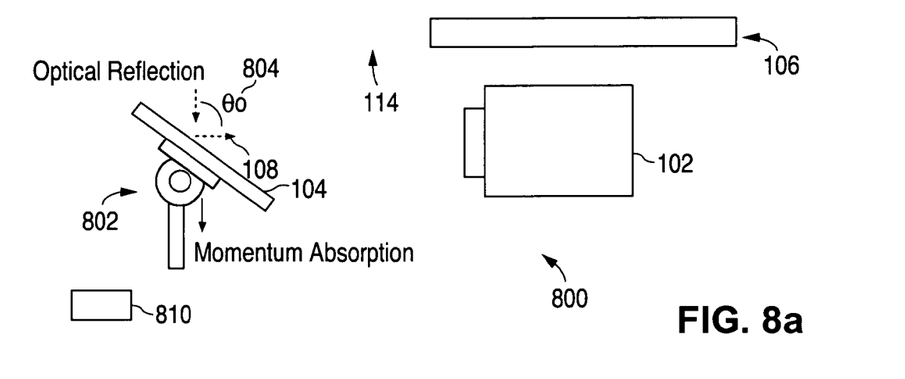
FIGS. 8*a*-8*c* show block diagrams illustrating an infrared camera system mounted to a vehicle in accordance with one or more embodiments of the present invention.
Figure 8B:
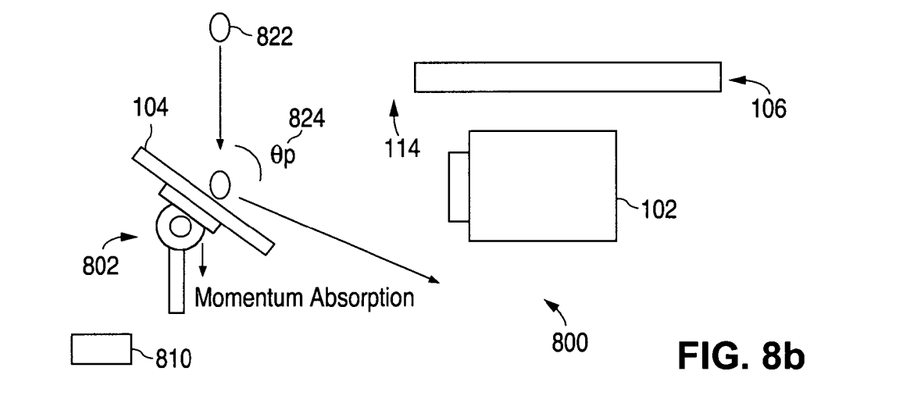
Figure 8C:
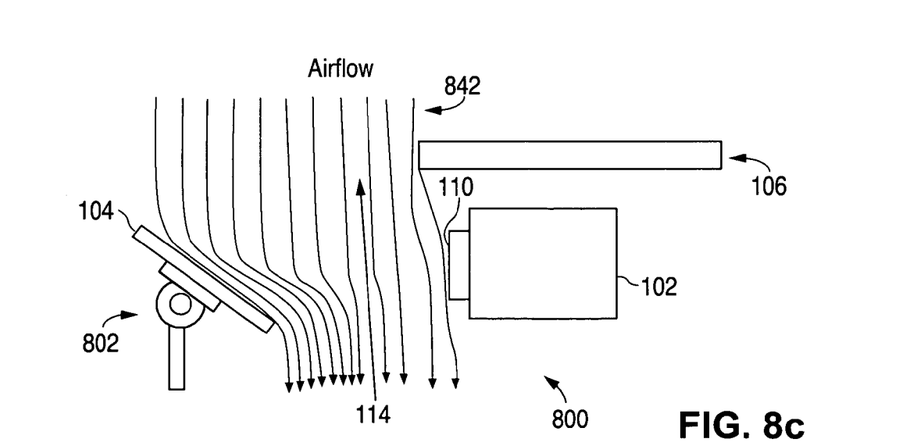

As additional exemplary implementations, FIGS. 8a-8c show block diagrams illustrating a system 800, which includes infrared camera 102 mounted to vehicle 106 in accordance with one or more embodiments of the present invention. Plate 104 is mounted within vehicle 106 (e.g., a portion of vehicle 106 is shown, such as a portion of a front bumper along with a portion of opening 114) via a plate mount 802 and reflects infrared energy 108 to infrared camera 102.

FIGS. 8a-8c illustrate certain advantages that may be provided by techniques disclosed herein relative to conventional approaches. For example, FIGS. 8a and 8b illustrate in accordance with one or more embodiments of the present invention the ability of plate 104 to absorb an impact from debris and/or redirect the debris, such as exemplary debris 822 (e.g., a rock), away from infrared camera 102. FIG. 8a shows plate 104 providing optical reflection of infrared energy 108 at an exemplary angle ($\theta_O$) 804 to infrared camera 102. FIG. 8b shows plate 104 and plate mount 802 absorbing the energy and redirecting debris 822 to protect infrared camera 102. For example, debris 822 may also be deflected at an angle ($\theta_P$) 824 rather than optical reflection angle ($\theta_O$) 804 so that debris 822 does not strike infrared camera 102.

For example, plate mount 802 may allow plate 104 to flex and momentarily change its angle of orientation relative to infrared camera 102. Plate mount 802 may be made of conventional materials, as would be understood by one skilled in the art, to securely hold plate 104 while still allowing plate 104 to momentarily change its angle.

Plate mount 802, in accordance with one or more embodiments of the present invention, may also provide for movement of plate 104 and include motors, actuators, or other controllable conventional elements to move or position plate 104, as desired. For example, movement of plate 104 via plate mount 802 may be controlled by a processor 810 (e.g., a computer, microprocessor, or other control mechanism within vehicle 106). Consequently, processor 810 (e.g., as part of display 112 as discussed previously) may be used to provide apparent resolution, parallax, desired field of view, and/or scene based non-uniformity correction.

As another example, movement of plate 104 via plate mount 802 may be controlled, additionally or alternatively, by the driver or passenger of vehicle 106 via control buttons (e.g., four directional buttons on display 112) to control the desired field of view of infrared camera 102 (e.g., up, down, left, and right). For example, if vehicle 106 is a truck and a load is placed in the bed of the truck, the front and rear portions of the truck may be raised and lowered, respectively, and consequently the field of view of infrared camera 102 may be adjusted by the driver to compensate for this change in orientation of the truck (e.g., manual level control or automatic level control via processor 810).

FIG. 8c illustrates another potential advantage provided by techniques disclosed herein relative to conventional approaches. For example as shown, the position of infrared camera 102 relative to opening 114 and plate 104 may allow airflow 842 to be directed across lens 110 of infrared camera 102. Debris (e.g., debris 822) would generally strike vehicle 106 (e.g., the bumper or other structural member protecting infrared camera 102) or plate 104 and the directional change in airflow 842 would not be sufficient to result in the debris to strike infrared camera 102. However, airflow 842 may be sufficiently redirected to help sweep dust, ice, water, or other foreign particles off lens 110 in a general cleansing operation. Baffles or other structural features, as would be understood by one skilled in the art, may also be included within system 800 to assist in directing airflow 842.

Figure 9A:
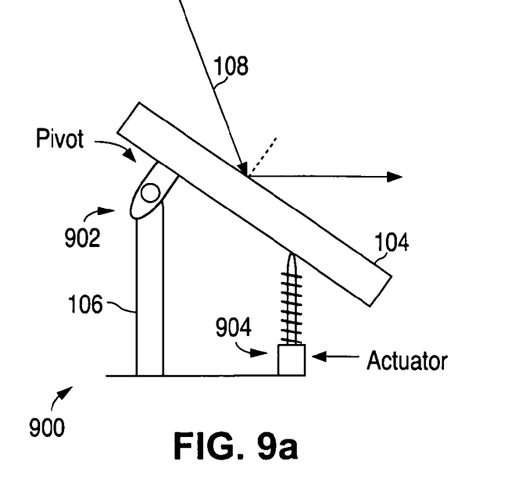
FIGS. 9*a*-9*d* show block diagrams illustrating exemplary plate systems mounted to a vehicle in accordance with one or more embodiments of the present invention.
Figure 9B:
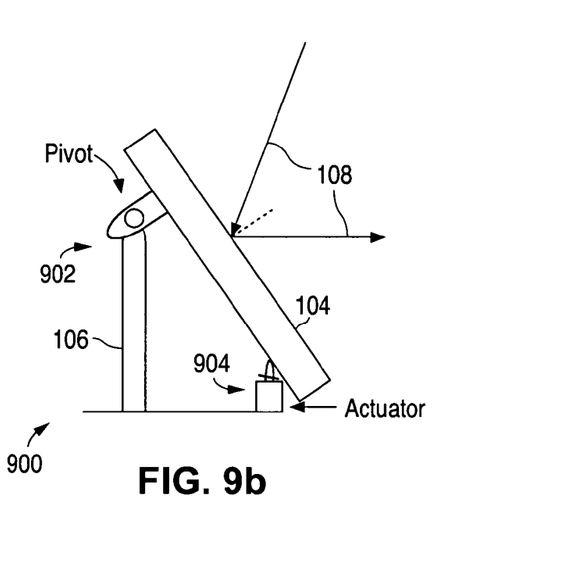

FIGS. 9a-9d show block diagrams illustrating exemplary plate systems 900 and 950 mounted to a portion of vehicle 106 in accordance with one or more embodiments of the present invention. Specifically, FIGS. 9a and 9b show plate system 900 having plate 104 mounted at a pivot point 902 and positioned or moved via an actuator 904. One or more actuators 904 may be used to provide the desired positioning (e.g., set screws) or movement (e.g., motorized actuator) functionality desired of plate 104. For example, one or more of actuators 904 may be a motorized actuator and controlled (e.g., via processor 810) to provide the desired apparent resolution, parallax, desired field of view (e.g., panning), and/or scene based non-uniformity correction.

Figure 9C:
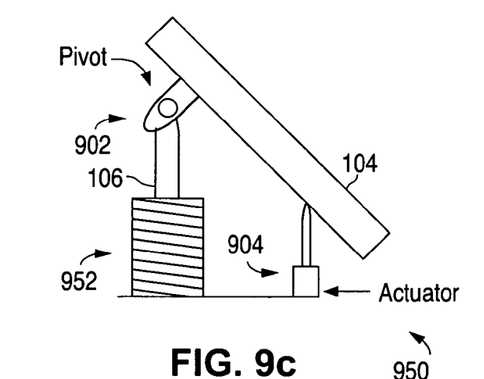
Figure 9D:
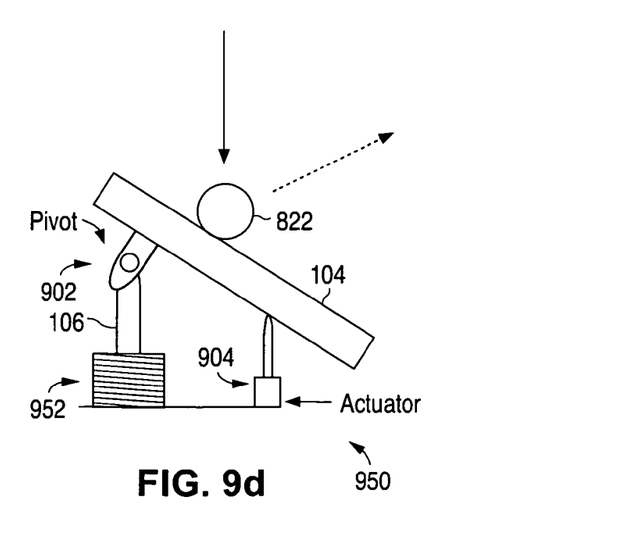

FIGS. 9c and 9d illustrate in an exemplary fashion that actuators 904, pivot point 902, and/or the portion of vehicle 106 may be designed to provide some type of flexing (e.g., momentum absorbing or dampening quality). For example, as discussed previously and shown in FIG. 9d, plate 104 may be secured in such a fashion with a flexure 952 (e.g., a spring and/or elastomer material) to absorb a strike by debris 822 and redirect debris 822 away from infrared camera 102.

Systems and methods are disclosed herein to provide improved infrared camera techniques for vehicular applications. For example, in accordance with an embodiment of the present invention, an infrared camera system for a vehicle is disclosed that employs one or more plates to reflect infrared energy to an infrared camera. The plates allow the infrared camera to provide a desired line of sight view without requiring the infrared camera to be directly in the line of sight. Consequently as discussed herein, the infrared camera system may provide certain advantages over conventional approaches for incorporating an infrared camera within a vehicle.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A vehicle comprising:
 a first plate disposed within the vehicle and adapted to reflect infrared energy;
 an opening in the vehicle through which the infrared energy passes prior to being reflected by the first plate, wherein air from outside of the vehicle is allowed to pass through the opening to the first plate;
 an infrared camera coupled to and disposed within the vehicle, wherein the infrared camera is adapted to detect the infrared energy reflected from the first plate to provide infrared images; and
 a first plate mount adapted to secure the first plate to the vehicle, wherein the first plate mount is adapted to momentarily change an angle of orientation of the first plate relative to the infrared camera when the first plate is struck by debris passing through the opening.

2. The vehicle of claim 1, further comprising:
 a passenger compartment, and
 a display within the passenger compartment and linked to the infrared camera to show the infrared images provided by the infrared camera; and
 wherein the first plate mount is adapted to absorb energy from debris that strikes the first plate and redirect the debris via the first plate away from the infrared camera.

3. The vehicle of claim 1, further comprising user controls within the passenger compartment, wherein the user controls are configured to allow a user to change a field of view of the infrared camera via the user controls.

4. The vehicle of claim 1, wherein the first plate has a hydrophobic coating.

5. The vehicle of claim 1, further comprising a processor coupled to the first plate mount and adapted to control movement of the first plate via the first plate mount.

6. The vehicle of claim 5, wherein the processor is adapted to control movement of the first plate to provide at least one of an apparent resolution, a parallax, and a scene based non-uniformity correction.

7. The vehicle of claim 5, wherein the processor is adapted to control movement of the first plate to direct a field of view of the infrared camera into a turn to provide curve imaging.

8. The vehicle of claim 1, wherein the first plate mount comprises at least one of a flexure and/or an actuator to allow the first plate to move when struck by debris.

9. The vehicle of claim 1, wherein the first plate provides an optical power function.

10. The vehicle of claim 1, wherein a line of sight of the infrared camera is disposed at an angle greater than zero degrees relative to infrared energy passing through the opening.

11. The vehicle of claim 1, wherein the first plate comprises a plurality of the first plates coupled to the vehicle and configured to reflect the infrared energy to the infrared camera.

12. The vehicle of claim 1, wherein at least one of the opening and/or the first plate directs at least a portion of the air passing through the opening across an external surface of a lens of the infrared camera.

13. An infrared camera system for a vehicle, the system comprising:
  a first plate adapted to reflect infrared energy;
  a first plate mount adapted to secure the first plate to the vehicle, wherein the first plate mount is adapted to momentarily change an angle of orientation of the first plate when the first plate is struck by debris passing through an opening in the vehicle; and
  an infrared camera adapted to detect infrared energy reflected from the first plate to provide infrared images.

14. The system of claim 13, further comprising a mounting bracket adapted to secure the infrared camera to the vehicle, wherein the angle of orientation of the first plate is relative to the infrared camera, and wherein the first plate mount is adapted to absorb energy from debris that strikes the first plate and redirect the debris via the first plate away from the infrared camera.

15. The system of claim 13, further comprising means for moving the first plate, and wherein the first plate mount comprises at least one of a flexure and/or an actuator to allow the first plate to move when struck by debris.

16. A vehicle comprising:
  means for passing infrared energy into the vehicle;
  means for reflecting the infrared energy after traveling through the passing means;
  means for securing the reflecting means within the vehicle; and
  means for capturing infrared images based on the infrared energy provided by the reflecting means, wherein the capturing means is disposed within the vehicle;
  wherein the reflecting means directs air flowing from outside of the vehicle and through the passing means to an external infrared transmissive surface of the capturing means.

17. The vehicle of claim 16, further comprising means for displaying the infrared images provided by the capturing means, and wherein the securing means is adapted to momentarily change an angle of orientation of the reflecting means relative to the capturing means when the reflecting means is struck by debris passing through the passing means.

18. The vehicle of claim 16, further comprising means for controlling movement of the reflecting means to provide at least one a desired field of view for the capturing means and additional processing of the infrared images.

19. The vehicle of claim 16, wherein the securing means is adapted to absorb energy from debris that strikes the reflecting means and redirect the debris via the reflecting means away from the capturing means.

20. A method of capturing infrared images within a vehicle, the method comprising:
  providing an opening through which infrared energy and air enters the vehicle;
  reflecting the infrared energy and the air with a first plate after passing through the opening;
  capturing the infrared images with an infrared camera based on the infrared energy reflected from the first plate; and
  changing momentarily an angle of orientation of the first plate when the first plate is struck by debris passing through the opening.

21. The method of claim 20, further comprising displaying the infrared images from the capturing, and wherein the changing comprises absorbing energy from debris that strikes the first plate and redirecting the debris via the first plate away from the infrared camera.

22. The method of claim 20, further comprising controlling the reflected to provide at least one a desired field of view for the capturing and a movement for processing of the infrared images.

23. The method of claim 20, wherein the reflecting comprises reflecting the infrared energy to a first angle and then reflecting the infrared energy to at least a second angle prior to the capturing.

24. The method of claim 20, wherein at least one of the providing and the reflecting directs airflow to an external lens surface of the infrared camera.

* * * * *